United States Patent
Park

(10) Patent No.: US 9,481,039 B2
(45) Date of Patent: Nov. 1, 2016

(54) ASSEMBLY OF DOUBLE-SIDED INDEXABLE CUTTING INSERT AND SHIM

(75) Inventor: Hong Sik Park, Daegu (KR)

(73) Assignee: TaeguTec, Ltd., Dalseong-gun, Daegu (KR)

( * ) Notice: Subject to any disclaimer, the term of this patent is extended or adjusted under 35 U.S.C. 154(b) by 881 days.

(21) Appl. No.: 13/382,754

(22) PCT Filed: Jul. 6, 2010

(86) PCT No.: PCT/KR2010/004388
§ 371 (c)(1),
(2), (4) Date: Jan. 6, 2012

(87) PCT Pub. No.: WO2011/005006
PCT Pub. Date: Jan. 13, 2011

(65) Prior Publication Data
US 2012/0114435 A1    May 10, 2012

(30) Foreign Application Priority Data

Jul. 9, 2009 (KR) .................. 10-2009-0062534

(51) Int. Cl.
*B23B 27/16* (2006.01)

(52) U.S. Cl.
CPC ...... *B23B 27/1614* (2013.01); *B23B 2200/081* (2013.01); *B23B 2200/082* (2013.01); *B23B 2200/161* (2013.01); *B23B 2200/325* (2013.01);
(Continued)

(58) Field of Classification Search
CPC .............. B23B 2200/081; B23B 2200/321; B23B 2200/087; B23B 2200/323; B23B 2200/161; B23B 2200/082; B23B 2200/325; B23B 27/1614; B23B 2205/16

USPC .............. 407/113–115, 33, 40, 42, 48, 100, 407/102–104
See application file for complete search history.

(56) References Cited

U.S. PATENT DOCUMENTS 3,121,939 A * 2/1964 Williams ................. 407/103
3,629,919 A * 12/1971 Trevarrow, Jr. ......... 407/103
(Continued)

FOREIGN PATENT DOCUMENTS

DE     19653921     7/1997
EP     1 454 690    9/2004
(Continued)

OTHER PUBLICATIONS

Search report dated Feb. 8, 2013 issued in Europen counterpart application (No. 10797280.4).
(Continued)

*Primary Examiner* — Sara Addisu
(74) *Attorney, Agent, or Firm* — Womble Carlyle

(57) ABSTRACT

An assembly includes a double-sided indexable cutting insert and a reinforcing part. The assembly can be used to process metallic materials and the like. The polygonal, double-sided indexable cutting insert of the present invention has a plurality of convex portions at each corner portion. The level of the convex portions is lower than that of the corner cutting edges. Further, the reinforcing part of the present invention has flat portions that come into contact with the convex portions of the cutting insert at each corner portion. When the cutting insert and the reinforcing part are assembled together, the flat portions of the reinforcing part contact at least three convex portions of the cutting insert.

20 Claims, 7 Drawing Sheets

(52) U.S. Cl.
CPC ....... *B23B 2205/16* (2013.01); *Y10T 407/2274* (2015.01); *Y10T 407/2276* (2015.01); *Y10T 407/23* (2015.01); *Y10T 407/235* (2015.01)

(56) References Cited

U.S. PATENT DOCUMENTS

| | | | | |
|---|---|---|---|---|
| 3,815,192 A * | 6/1974 | Ohtsu et al. | ................. | 407/114 |
| 3,837,058 A * | 9/1974 | Barkley et al. | ............... | 407/103 |
| 4,214,845 A * | 7/1980 | Mori | ............................ | 407/114 |
| 4,304,509 A * | 12/1981 | Mori | ............................ | 407/114 |
| 4,315,706 A * | 2/1982 | Erkfritz | ........................ | 407/101 |
| 4,318,645 A * | 3/1982 | McCreery | .................... | 407/114 |
| 4,915,548 A * | 4/1990 | Fouquer et al. | ............. | 407/114 |
| 5,046,899 A * | 9/1991 | Nishi | ............................ | 407/102 |
| 5,275,633 A * | 1/1994 | Johansson et al. | ............ | 51/309 |
| 5,282,703 A * | 2/1994 | Itaba et al. | .................... | 407/114 |
| 5,314,269 A | 5/1994 | Arai et al. | | |
| 5,478,175 A * | 12/1995 | Kraemer | ........................... | 407/7 |
| 5,658,100 A * | 8/1997 | Deiss et al. | ..................... | 407/35 |
| 5,702,210 A * | 12/1997 | Boianjiu | ........................ | 407/100 |
| 5,738,468 A | 4/1998 | Boianjiu | | |
| 5,836,723 A * | 11/1998 | Von Haas et al. | ............ | 407/107 |
| 5,888,029 A * | 3/1999 | Boianjiu | ........................... | 407/66 |
| 6,126,366 A * | 10/2000 | Lundblad | ..................... | 407/102 |
| 6,158,928 A * | 12/2000 | Hecht | ........................... | 407/102 |
| 6,238,133 B1 * | 5/2001 | DeRoche et al. | ........... | 403/359.1 |
| 6,379,087 B1 * | 4/2002 | Alexander, IV | ............. | 407/107 |
| 6,543,970 B1 * | 4/2003 | Qvarth et al. | ................ | 407/114 |
| 7,073,987 B2 * | 7/2006 | Hecht | ........................... | 407/113 |
| 7,121,772 B2 * | 10/2006 | Krahula et al. | .............. | 407/113 |
| 7,156,006 B2 * | 1/2007 | Hyatt et al. | ..................... | 82/1.11 |
| 7,182,555 B2 * | 2/2007 | Kitagawa et al. | ............ | 407/113 |
| 7,201,545 B2 * | 4/2007 | Ejderklint | ..................... | 409/131 |
| 7,326,007 B2 * | 2/2008 | Hecht | ........................... | 407/109 |
| 7,357,604 B2 * | 4/2008 | Craig | ............................ | 407/113 |
| 7,381,015 B2 * | 6/2008 | Jonsson | ......................... | 407/116 |
| 7,429,150 B2 * | 9/2008 | Kovac | ............................ | 407/66 |
| 7,632,046 B2 | 12/2009 | Andersson et al. | | |
| 7,785,045 B2 * | 8/2010 | Viol | ............................... | 407/101 |
| D638,452 S * | 5/2011 | Morrison et al. | ........... | D15/139 |
| D640,717 S * | 6/2011 | Morrison et al. | ........... | D15/139 |
| 7,959,383 B2 * | 6/2011 | Choi et al. | .................... | 407/105 |
| 8,137,035 B2 * | 3/2012 | Uchijo et al. | ................ | 407/116 |
| 8,568,064 B2 * | 10/2013 | Carl | ................ | 407/66 |
| 8,573,903 B2 * | 11/2013 | Morrison et al. | ........... | 407/113 |
| 8,657,539 B2 * | 2/2014 | Morrison et al. | ............ | 407/113 |
| D709,110 S * | 7/2014 | Morrison et al. | ........... | D15/139 |
| 2005/0152754 A1 * | 7/2005 | Wiman et al. | ................ | 407/103 |
| 2005/0254909 A1 * | 11/2005 | Krahula et al. | .............. | 407/114 |
| 2006/0210365 A1 * | 9/2006 | Hecht | ........................... | 407/103 |
| 2007/0189862 A1 * | 8/2007 | Viol | ............................... | 407/113 |
| 2007/0245535 A1 * | 10/2007 | Noggle | ........................... | 29/428 |
| 2008/0193233 A1 * | 8/2008 | Park | ............................... | 407/104 |
| 2008/0199263 A1 * | 8/2008 | Jonsson et al. | ................ | 407/11 |
| 2009/0290945 A1 | 11/2009 | Carl | | |
| 2010/0061816 A1 * | 3/2010 | Koerner et al. | .............. | 407/114 |
| 2013/0251463 A1 * | 9/2013 | Harif | ............................. | 407/11 |

FOREIGN PATENT DOCUMENTS

| | | | |
|---|---|---|---|
| JP | 1974-032279 A | | 3/1974 |
| JP | 01171705 A | * | 7/1989 |
| JP | 1989-132303 U | | 9/1989 |
| JP | 06190608 A | * | 7/1994 |
| JP | 1995-015204 U | | 3/1995 |
| JP | 1997-066405 A | | 3/1997 |
| JP | 11-197910 A | | 7/1999 |
| JP | 2000-126908 A | | 5/2000 |
| JP | 2009006437 A | * | 1/2009 |
| WO | WO 94/15741 | | 7/1994 |
| WO | WO 2009001973 A1 | * | 12/2008 |

OTHER PUBLICATIONS

Official Action dated Apr. 17, 2013 issued in Chinese counterpart application (No. 201080030874.1).
Search Report dated Apr. 17, 2013 issued in Chinese counterpart application (No. 201080030874.1).
Official Action dated May 17, 2013 issued in Japanese counterpart application (No. 2012-517416).
International Search Report in PCT/KR2010/004388, dated Feb. 28, 2011.
Written Opinion in PCT/KR2010/004388, dated Feb. 28, 2011.

* cited by examiner

ASSEMBLY OF DOUBLE-SIDED INDEXABLE CUTTING INSERT AND SHIM

RELATED APPLICATIONS

This is a 35 USC 371 U.S. National Phase of International Application No. PCT/KR2010/004388, filed 6 Jul. 2010 and published in English as WO 2011/005006A2 on 13 Jan. 2011, which claims priority to KR 10-2009-0062534, filed 9 Jul. 2009. The contents of the aforementioned applications are incorporated by reference in their entirety.

TECHNICAL FIELD

The present invention relates to an assembly of a double-sided indexable cutting insert and a reinforcing part, which is used to process metallic materials and the like.

BACKGROUND ART

Rough grinding refers to a method of roughly processing metal under severe cutting conditions. To minimize forces applied during rough grinding, the cutting edges of a cutting insert are provided at a high position and the grooves on the inside are typically formed to slope down towards a center of the cutting insert.

In a single-sided cutting insert, the supporting surface at the bottom portion is ground flat so that it can be securely mounted on a tool holder or a reinforcing part (i.e., a 'shim'). However, in a double-sided cutting insert wherein its top and bottom are symmetrical to each other, the supporting surfaces of such cutting insert are located at a lower position than the cutting edges. Consequently, the supporting surfaces cannot be ground and the inevitable deformations occurring during a manufacturing process tend to cause deviations in the level of the supporting surfaces. In such a case, the cutting insert cannot be securely mounted on the reinforcing part or the tool holder.

Korean Patent Application No. 2008-7026943 is directed to mounting a double-sided indexable cutting insert (1) on a supporting plate (2). FIG. 1 illustrates a tool holder and a supporting plate in accordance with the prior art. The upper portion of the supporting plate (2) is provided with a plurality of planar zones (3a, 3b, 3c), while the upper surface of the cutting insert (1) is provided with contact surfaces (4a, 4b, 4c) that contact the planar zones. The contact surfaces of the cutting insert are formed by machine pressing. However, due to the inevitable deformations of the cutting insert during a pressing process and the resulting deviations in the height of the supporting surfaces, only two of the contact surfaces might contact the planar zones and a gap may exist between the remaining contact surface and the planar zone. This causes the cutting insert to vibrate during cutting processes, which in turn significantly compromises accuracy, and substantially reduces the cutting tool's lifespan.

Additionally, a through-hole is formed at the center of the above cutting insert for mounting the cutting insert on the reinforcing part or the tool holder. When the cutting insert is mounted by means of a screw, the screw is inserted into the tapered through-hole of the cutting insert. In such a case, since the screw engages the internal thread of a screw that is used to mount the supporting plate, the clamping force needed to secure the cutting insert is limited. Further, replacing the cutting insert becomes cumbersome since the screw must be fully disengaged each time the cutting insert is replaced. Moreover, the screw easily wears out, thus reducing the clamping force that pushes the cutting insert against the wall of the tool holder, which in turn often causes damages to the cutting insert. When the cutting insert is mounted by means of a lever, the through-hole of the cutting insert is prismatic, i.e., the diameter of the through-hole is constant. While this provides a good clamping force against the wall of the tool holder, the clamping force against the bottom of the tool holder's pocket tends to be poor, thereby causing the cutting insert to lift during cutting processes and as a result becoming easily damaged. Accordingly, mounting the cutting insert by means of a screw or a lever causes the problem of the cutting insert becoming dislodged from the tool holder's pocket under severe cutting conditions.

SUMMARY

The objective of the present invention is to solve the above technical problems of the prior art. That is, the present invention seeks to effectively prevent the cutting insert from becoming dislodged from its original position on the tool holder, while ensuring a stable engagement between the cutting insert and the tool holder at all times.

The present invention further seeks to transmit a sufficient amount of forces in the lateral and downward directions of the tool holder so that the cutting insert can be securely fastened.

To achieve the above objectives, the polygonal, double-sided indexable cutting insert of the present invention comprises a plurality of convex portions at each corner portion. The level of the convex portions is lower than that of the corner cutting edges. Further, the shim (reinforcing party) of the present invention comprises flat portions that come into contact with the convex portions of the cutting insert at each corner portion. When the cutting insert and the reinforcing part are assembled together, the flat portions of the reinforcing part contact at least three convex portions of the cutting insert.

Further, the cutting insert comprises a through-hole at the center, which is top-bottom symmetrical and is also rotatably symmetrical relative to the central axis passing vertically through its center. The diameter of the through-hole decreases from each end of the through-hole towards the center, thereby forming a convex portion inside the through-hole. In order to secure the cutting insert, an L-shaped lever is inserted into the through-hole of the cutting insert. The L-shaped lever contacts the convex portion of the through-hole and exerts lateral and downward pressures to secure the cutting insert against the tool holder.

According to the present invention, a secure contact between the double-sided indexable cutting insert and the reinforcing part is maintained even under severe cutting conditions since such contact is always made at three or more points. Accordingly, even greater precision is possible during processing and the tool's lifespan is significantly increased.

Moreover, the cutting insert is secured on the tool holder without becoming dislodged even under severe cutting conditions since the L-shaped lever exerts lateral and downward pressures on the cutting insert against the tool holder.

DETAILED DESCRIPTION

Hereinafter, the present invention will be described in detail with reference to the accompanying drawings.

Figure 1:
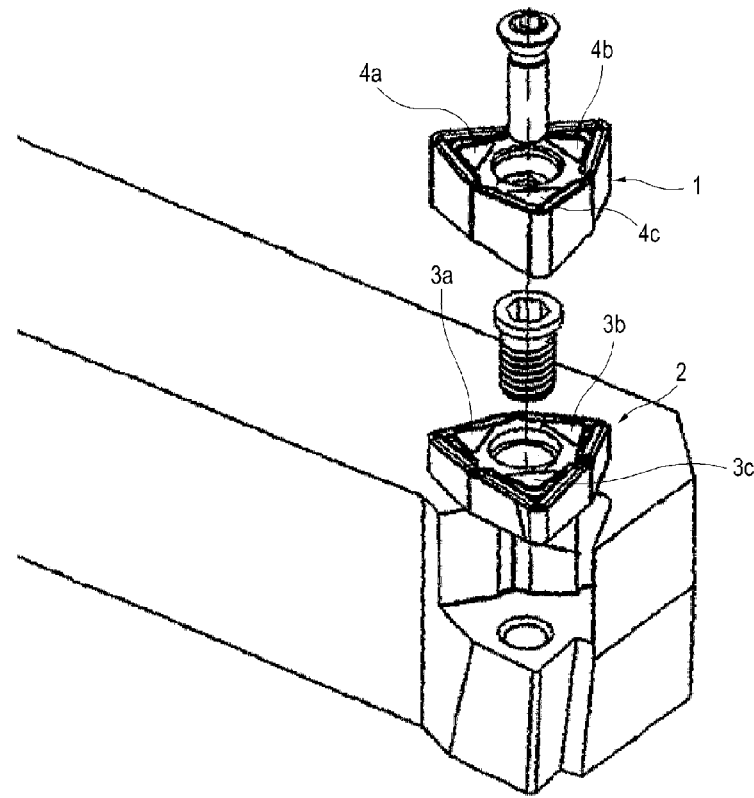
FIG. 1 shows a cutting tool according to the prior art.
Figure 2:
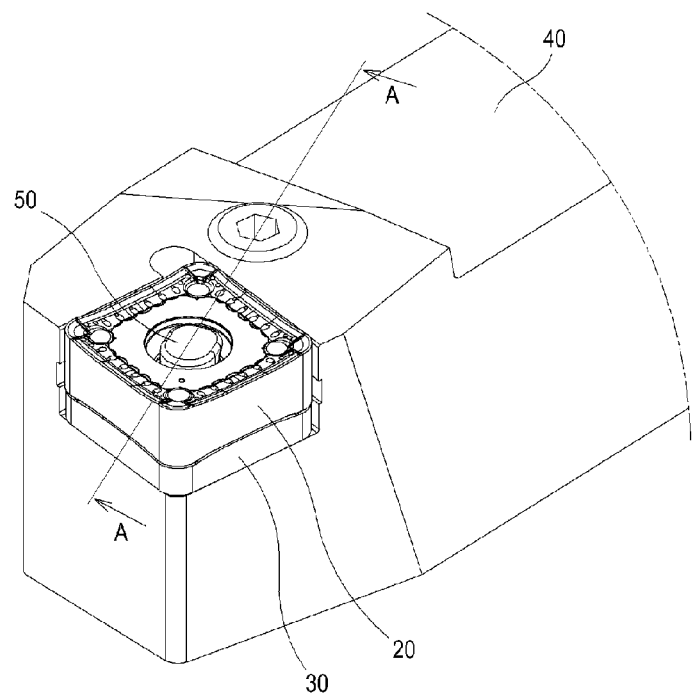
FIG. 2 is a perspective view of a cutting tool of the present invention, which comprises an assembly of a cutting insert and a shim (reinforcing party).
Figure 3:
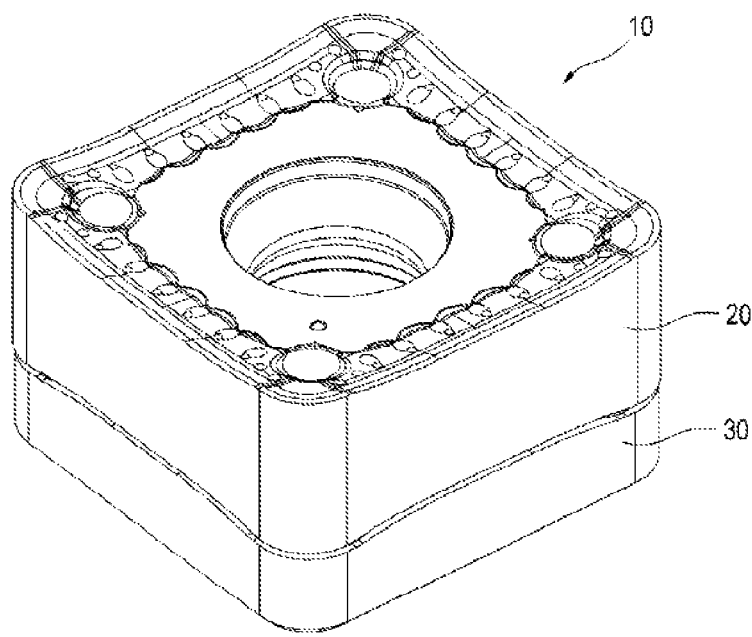
FIG. 3 is a perspective view of the assembly of the cutting insert and the reinforcing part according to the present invention.
Figure 4:
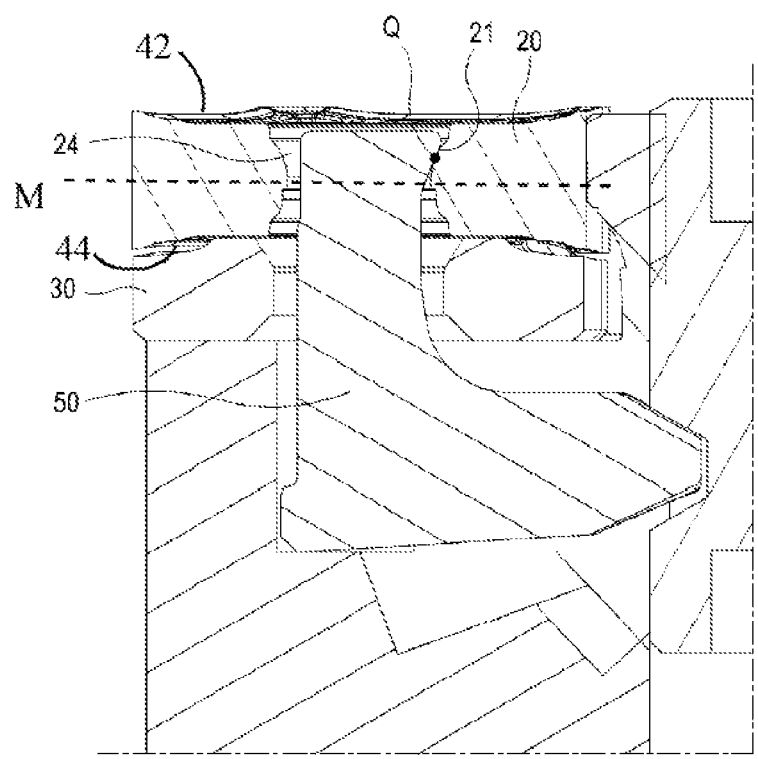
FIG. 4 is a cross-sectional view through Line A-A in FIG. 2.

FIG. 2 is a perspective view of a cutting tool according to the present invention, which comprises an assembly of a double-sided indexable cutting insert and a reinforcing part. FIG. 3 is a perspective view of the assembly of the cutting insert and the reinforcing part according to the present invention. FIG. 4 is a cross-sectional view through Line A-A in FIG. 2. As shown in FIG. 2, a shim (reinforcing party) (30) is mounted on a tool holder (40) and a double-sided indexable cutting insert (20) is in turn mounted on the reinforcing part. As shown in FIG. 4, the reinforcing part and the cutting insert are secured on the tool holder (4) by an L-shaped lever (50).

A through-hole (24) is formed at the center of the cutting insert to engage the L-shaped lever. The through-hole (24) is top-bottom symmetrical and is also rotatably symmetrical relative to a central axis (1) passing vertically through its center (O). The diameter of the through-hole (24) decreases from each end of the through-hole (24) towards the center, thereby forming a convex portion (21) inside the through-hole (24) (see FIG. 5). The L-shaped lever (50) secures the cutting insert against the tool holder by contacting the cutting insert at one point (Q) on the convex portion (21). The convex portion (21) can be curved, as shown in FIG. 4, or it can comprise flat surfaces sloped at certain rake angles.

Figure 5:
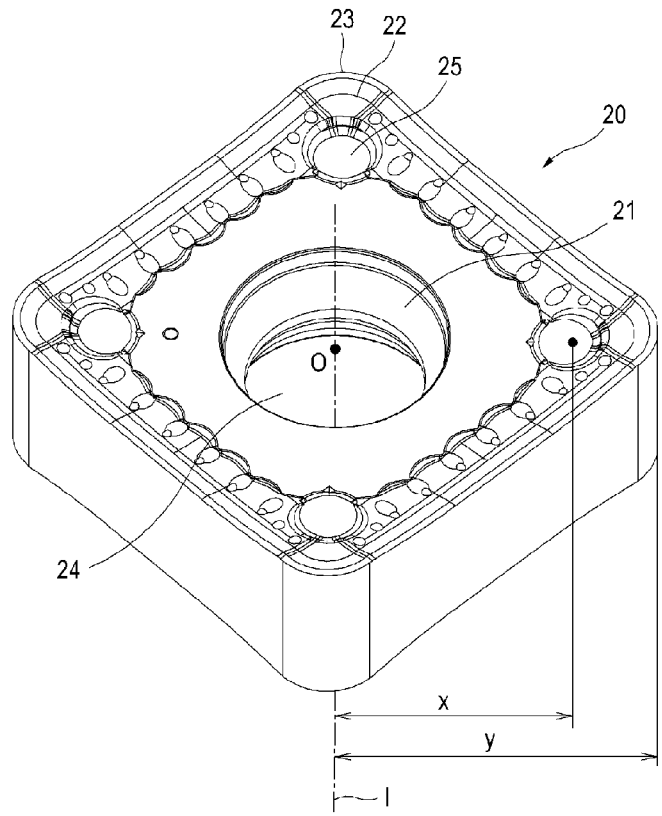
FIG. 5 is a perspective view of the cutting insert according to the present invention.

As shown in FIG. 4, the cutting insert (20) has opposing top and bottom polygonal surfaces (42), (44), respectively, and a midplane (M) midway between the opposing polygonal surfaces in a thickness direction of the insert, the thickness direction being defined in a direction between one of the top and bottom polygonal surfaces and the other of the top and bottom polygonal surfaces. FIG. 5 is a perspective view of the double-sided indexable cutting insert according to the present invention. Cutting edges are formed at the peripheral portion of the cutting insert and are positioned at the highest portion, i.e., farther from the midplane (M). Accordingly, the middle of the cutting insert is at a lower level (i.e., is closer to the midplane (M)) than the peripheral portion. At the center of the middle portion, a through-hole (24) is formed for inserting a component that fastens the cutting insert. The cutting insert according to the present embodiment is rectangular and a dome-shaped convex portion (25) is formed near a corner cutting edge (23) at each corner portion (22) of the rectangle. Each of the dome-shaped convex portions (25) is closer to the midplane (M) than a corner cutting edge (23) at each corner portion (22).

Defining the distance from the center of the cutting insert to the center of the convex portion as x and the distance from the center of the cutting insert to the cutting insert's corner end as y, the x:y ratio is between 0.7:1 and 0.95:1. If this ratio is smaller than 0.7:1, i.e., the convex portions are too close to the cutting insert's center, then the convex portions cannot efficiently support the cutting forces. On the other hand, if the above ratio is larger than 0.95:1, i.e., the convex portions are too close to the peripheral portion of the cutting insert, then machining the convex portions and the grooves becomes difficult.

Figure 6:
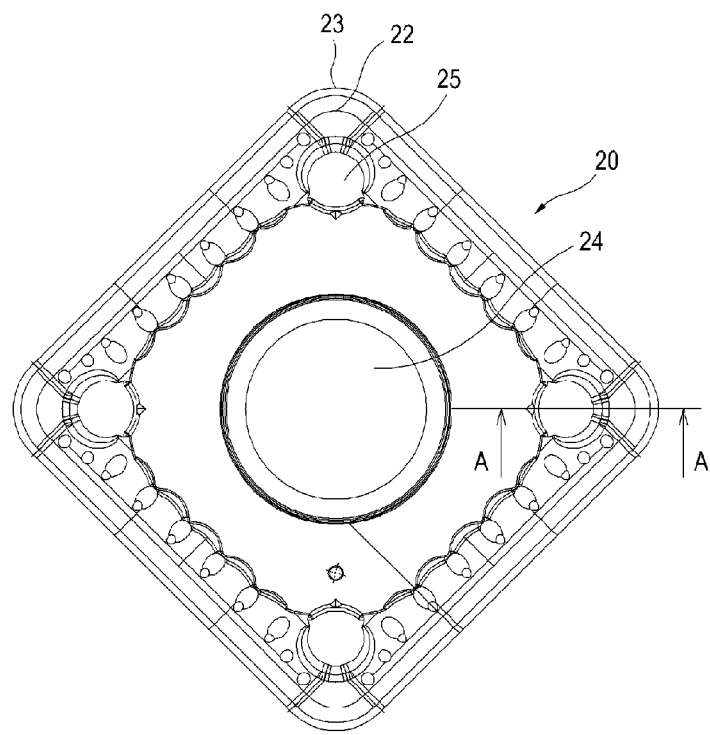
FIG. 6 is a plan view of the cutting insert according to the present invention.
Figure 7:
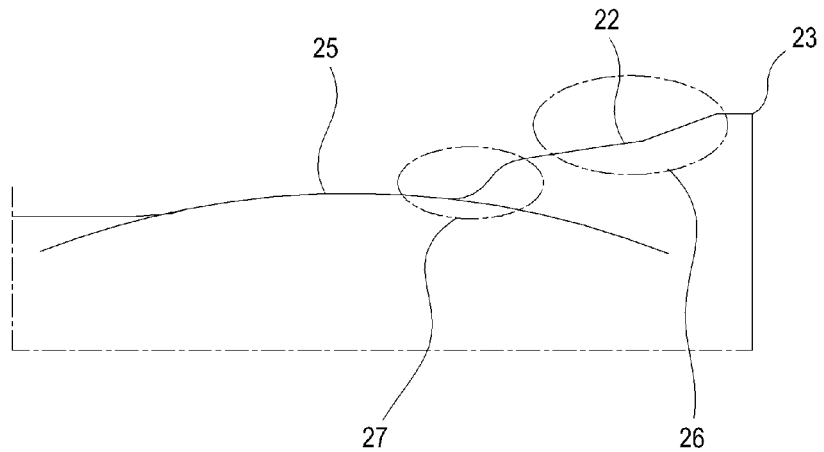
FIG. 7 is a cross-sectional view through Line A-A in FIG. 6.

FIG. 6 is a plan view of the cutting insert according to the present invention. FIG. 7 is a cross-sectional view through Line A-A in FIG. 6. As shown in FIG. 7, the peripheral portion of the cutting insert is located at the highest point and the rest slopes down towards the center. Also, to prevent chips created during cutting processes from striking the convex portions (25), the corner portions (22) comprise two steps of grooves, i.e., a first groove (26) extending from the corner cutting edge (23) of the corner portion (22) and a second groove (27) extending from the first groove at a steeper rake angle than the first groove. Thus, chips created at the edges are guided by the first groove so that they do not strike the convex portions (25) or adhere thereto.

Figure 8:
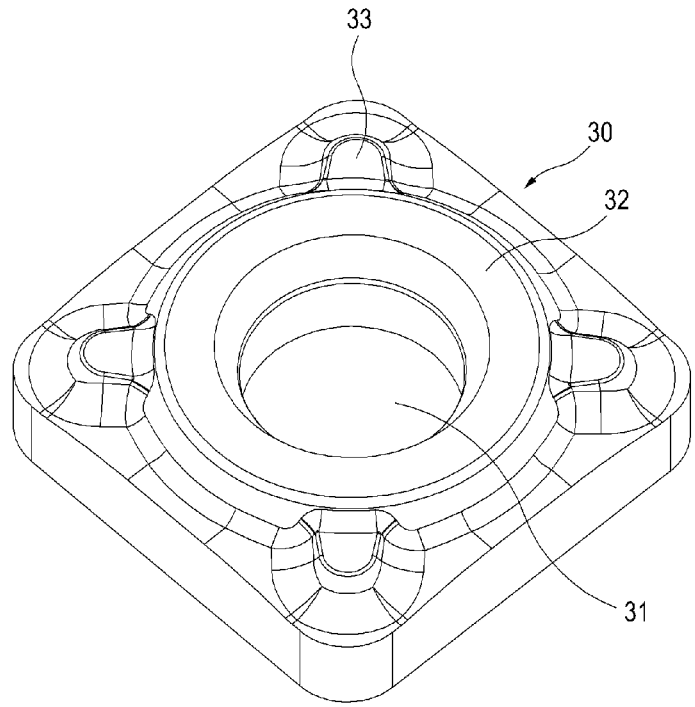
FIG. 8 is a perspective view of the reinforcing part according to Embodiment 1 of the present invention.
Figure 9:
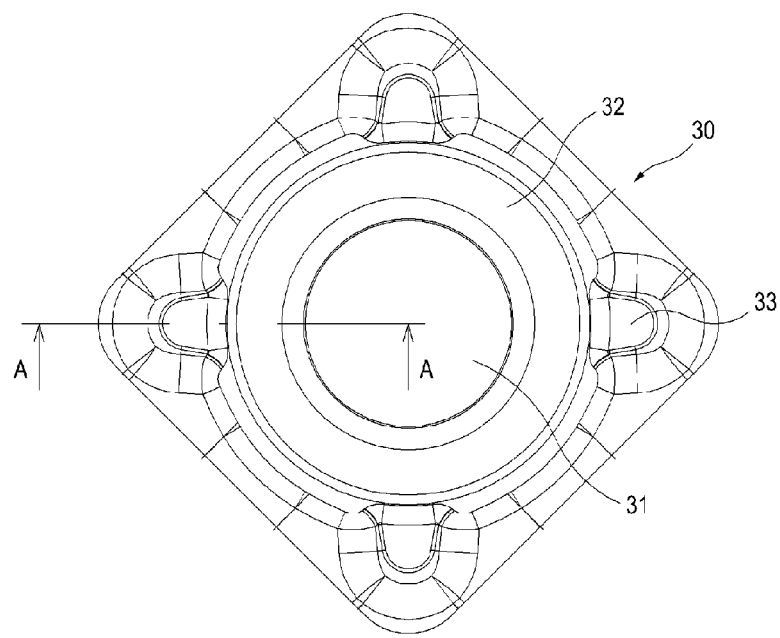
FIG. 9 is a plan view of the reinforcing part according to Embodiment 1 of the present invention.

FIG. 8 is a perspective view of the reinforcing part (30) according to Embodiment 1 of the present invention. FIG. 9 is a plan view of the reinforcing part (30) according to Embodiment 1 of the present invention. The reinforcing part (30) according to the present embodiment is rectangular, as is the cutting insert. At the center of the reinforcing part, a through-hole (31) is formed for inserting a fastening component and a ring-shaped elevated portion (32) is formed around the through-hole (31). The strength of the reinforcing part is improved since the elevated portion (32) increases the thickness of the reinforcing part. Further, a flat portion (33) is formed on the outside of the ring-shaped elevated portion and at each corner of the rectangle.

Figure 10:
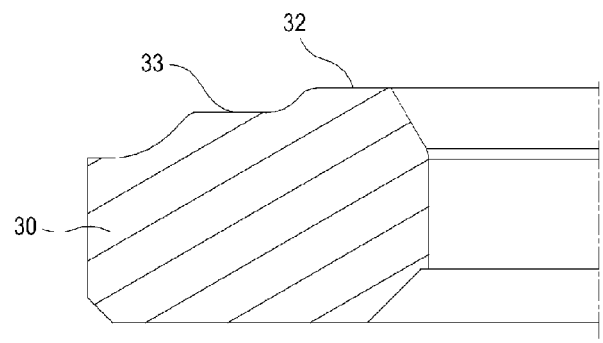
FIG. 10 is a cross-sectional view through Line A-A in FIG. 9.
Figure 11:
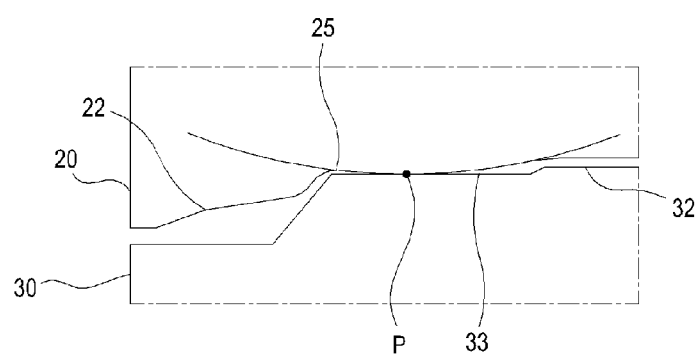
FIG. 11 shows a contact point between the cutting insert and the reinforcing part according to Embodiment 1 of the present invention.

FIG. 10 is a cross-sectional view through Line A-A in FIG. 9. As shown in FIG. 10, the level of the ring-shaped elevated portion (32) is higher than that of the flat portions (33), which are formed by machine pressing. FIG. 11 shows the contact point between the cutting insert (20) and the reinforcing part (30) according to Embodiment 1 of the present invention. The convex portions (25) of the cutting insert and the flat portions (33) of the reinforcing part contact each other at point P. Further, the cutting insert contacts the reinforcing part at no other point than the flat portions (33). Because three points always lie on a plane, the cutting insert (20) and the reinforcing part (30) always contact each other at three or more points. Accordingly, vibrations are prevented during cutting processes, thereby making processing precision possible.

Figure 12:
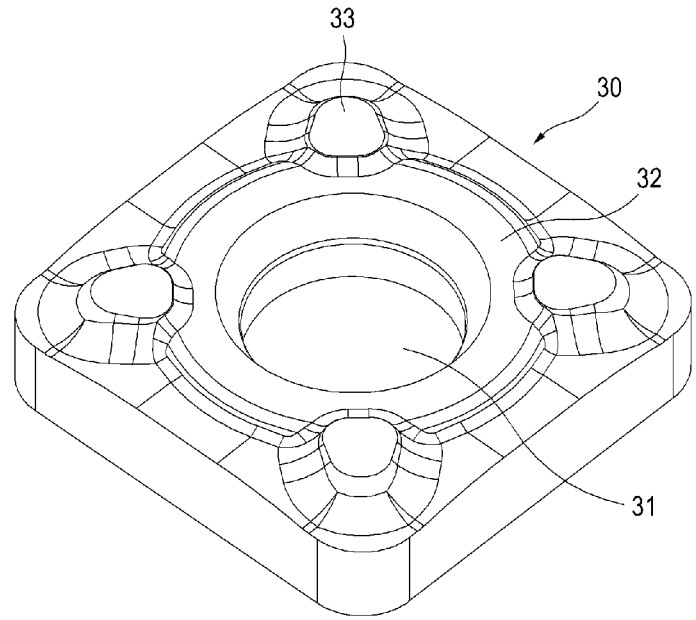
FIG. 12 is a perspective view of the reinforcing part according to Embodiment 2 of the present invention.
Figure 13:
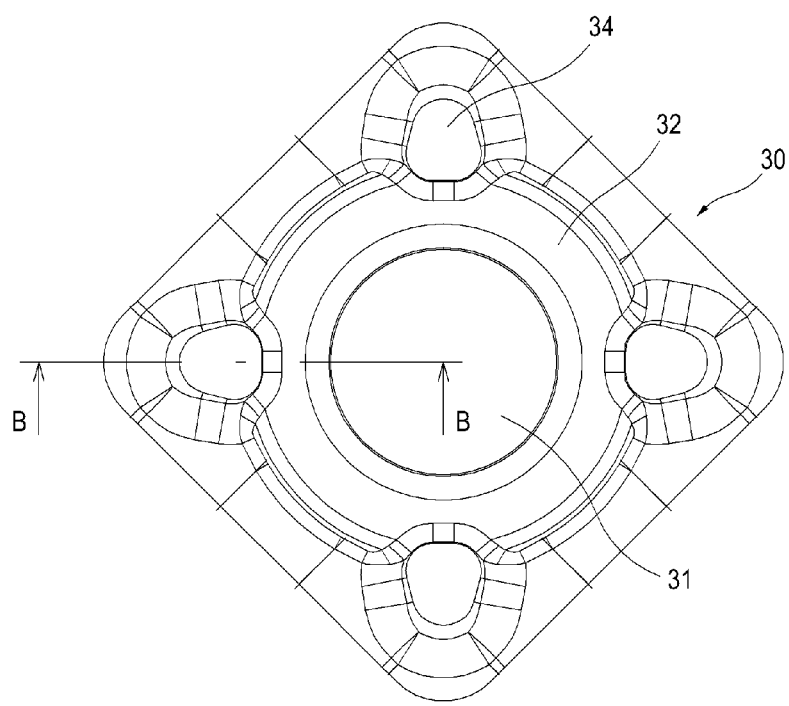
FIG. 13 is a plan view of the reinforcing part according to Embodiment 2 of the present invention.
Figure 14:
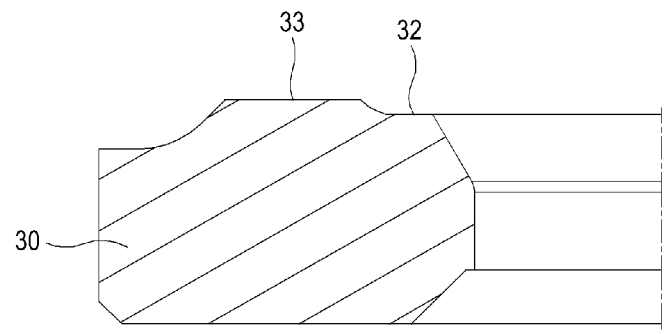
FIG. 14 is a cross-sectional view through Line B-B in FIG. 13.

FIGS. 12-15 show the reinforcing part (30) according to Embodiment 2 of the present invention. FIG. 12 is a perspective view of the reinforcing part (30) according to Embodiment 2 of the present invention. FIG. 13 is a plan view of the reinforcing part (30) according to Embodiment 2 of the present invention. FIG. 14 is a cross-sectional view through Line B-B in FIG. 13. As shown in FIG. 14, the reinforcing part (30) according to Embodiment 2 is different from that of Embodiment 1 since the flat portions (33) are at a higher position than the ring-shaped elevated portion (32). Also, since the flat portions (33) are at the highest point, they can be machined precisely by grinding.

Figure 15:
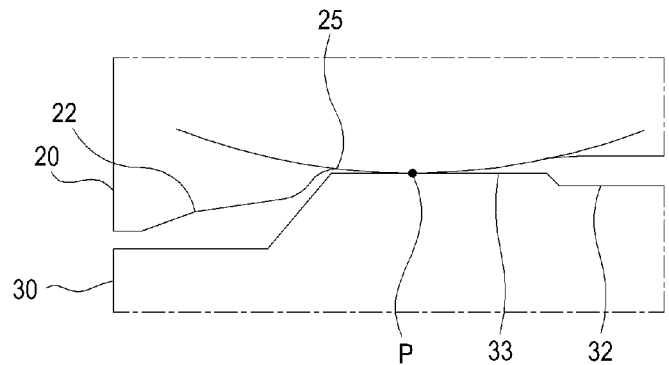
FIG. 15 shows a contact point of the cutting insert and the reinforcing part according to Embodiment 2 of the present invention.

FIG. 15 shows the contact point between the cutting insert (20) and the reinforcing part (30) according to Embodiment 2 of the present invention. Similar to Embodiment 1, the convex portions (25) of the cutting insert and the flat portions (33) of the reinforcing part contact each other at point P. Further, the cutting insert contacts the reinforcing part at no other point than the flat portions (33).

Figure 16:
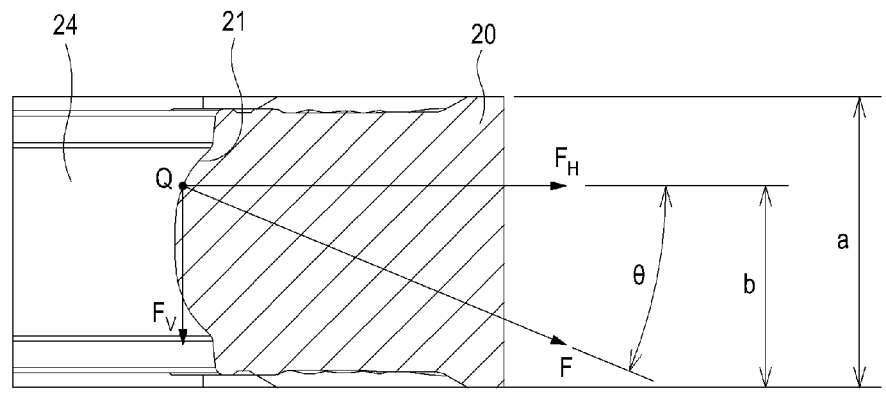
FIG. 16 illustrates a force applied to the cutting insert by the L-shaped lever shown in FIG. 4.

FIG. 16 shows the force and its components applied to the cutting insert by the L-shaped lever. F denotes the normal clamping force exerted by the L-shaped lever, θ denotes the angle of the clamping force with respect to the horizontal plane, and FH and FV denote the horizontal and vertical components of F, respectively. The L-shaped lever contacts the through-hole (24) of the cutting insert at point Q, and exerts horizontal and vertical clamping forces at that point. The horizontal clamping force FH prevents the cutting insert from being dislodged from the tool holder's pocket. Also, the vertical clamping force FV keeps the cutting insert firmly pressed against the tool holder's surface. As such, the cutting insert can be securely mounted on the tool holder in lateral and downward directions in a simple structure by utilizing the L-shaped lever.

The angle θ is preferably between 5° and 40°. If the angle is outside the preferred range, then either the horizontal or vertical clamping force becomes insufficiently strong to securely keep the cutting insert in place.

As shown in FIG. 16, when a is defined as the length of the cutting insert's through-hole (24), the distance (b) from the point (Q) at which the L-shaped lever contacts the cutting insert to the through-hole's bottom is 0.6a to 0.8a. If the distance (b) is smaller than 0.6a, i.e., the contact point is too low, then the distance between the cutting edge, at which the cutting force is applied, and the contact point becomes too large to effectively resist the rotational moment. Conversely, if the distance (b) is larger than 0.8a, i.e., the contact point is too high, then the through-hole's strength is compromised and the L-shaped lever may protrude above the through-hole, thus causing it to be struck by chips created during cutting processes.

The above embodiments of the present invention are intended only for illustration and are not intended to limit the present invention to the specific processes and forms, and many modifications and alternations are possible based thereon. For instance, the present invention does not preclude mounting the cutting insert on the tool holder by other clamping means such as a screw instead of the L-shaped lever, nor does it preclude circular or other polygonal cutting inserts and reinforcing parts. Also, the cutting insert and the reinforcing part of the present invention may be used not only for rough grinding but other types of machining.

The invention claimed is:

1. An assembly of a polygonal double-sided indexable cutting insert and a shim, wherein:
    said polygonal cutting insert has opposing top and bottom polygonal surfaces;
    said polygonal cutting insert has a midplane (M) located midway between the opposing polygonal surfaces, in a thickness direction of the cutting insert, the thickness direction extending in a direction from one of the top and bottom polygonal surfaces to the other of the top and bottom polygonal surfaces;
    said polygonal cutting insert comprises a plurality of corner portions on each of said opposing polygonal surfaces, a corner cutting edge being formed at each corner portion;
    said polygonal cutting insert comprises a plurality of convex portions formed on each of said opposing polygonal surfaces, each convex portion being closer, in said thickness direction, to the midplane (M) than a nearest corner cutting edge; and
    said shim comprises a plurality of flat portions, each of at least three of said plurality of flat portions configured to contact a corresponding one of at least three of the convex portions of the cutting insert.

2. The assembly of claim 1, wherein:
    said shim comprises a cylindrical through-hole located at a center of the shim and a ring-shaped elevated portion located around said through-hole; and
    said flat portions are disposed on the outside of said elevated portion and are disposed to be lower than said elevated portion.

3. The assembly of claim 2, wherein the shim is formed by machine pressing.

4. The assembly of claim 2, wherein each of the corner portions of the cutting insert includes a first groove sloping towards a center of the cutting insert and a second groove disposed closer to the center of the cutting insert than said first groove and descending at a steeper rake angle than the first groove.

5. The assembly of claim 2, wherein the cutting insert comprises a through-hole at the center of the cutting insert, the through-hole connecting the top and bottom polygonal surfaces and having a central axis around which the cutting insert has rotational symmetry, and
    wherein a diameter of said through-hole decreases from each end of the through-hole towards a center of the through hole, thereby forming a convex portion inside the through-hole.

6. The assembly of claim 5, wherein the assembly of the double-sided indexable cutting insert and the shim further includes an L-shaped lever to secure the cutting insert.

7. The assembly of claim 6, wherein said L-shaped lever is configured to contact the convex portion of the cutting insert's through-hole, thereby applying a clamping force to the cutting insert in lateral and downward directions.

8. The assembly of claim 7, wherein:
    the point at which the L-shaped lever contacts the cutting insert measured from the through-hole's bottom is 0.6a to 0.8a, wherein a is defined as the length of the cutting insert's through-hole.

9. The assembly of claim 7, wherein an angle (θ) of the clamping force with respect to the horizontal plane where the L-shaped lever contacts the cutting insert is between 5° and 40°.

10. The assembly of claim 1, wherein a ratio x:y is 0.7:1 to 0.95:1, wherein the distance from a center of the cutting insert to a center of the convex portion is defined as x and the distance from the center of the cutting insert to a corner of the cutting insert is defined as y.

11. The assembly of claim 1, wherein a ratio x:y is 0.7:1 to 0.95:1, wherein the distance from a center of the cutting insert to an apex of the convex portion is defined as x and the distance from the center of the cutting insert to a corner of the cutting insert is defined as y.

12. The assembly of claim 1, further comprising:
a through-hole formed at a center of the cutting insert and connecting the opposing polygonal surfaces.

13. An assembly of a polygonal double-sided indexable cutting insert and a shim, wherein:
said polygonal cutting insert has opposing top and bottom polygonal surfaces;
said polygonal cutting insert has a midplane (M) located midway between the opposing polygonal surfaces, in a thickness direction of the cutting insert, the thickness direction extending in a direction from one of the top and bottom polygonal surfaces to the other of the top and bottom polygonal surfaces;
said polygonal cutting insert comprises a plurality of corner portions on each of said opposing polygonal surfaces, a corner cutting edge being formed at each corner portion;
said polygonal cutting insert comprises a plurality of convex portions formed on each of said opposing polygonal surfaces, each convex portion being closer, in said thickness direction, to the midplane (M) than a nearest corner cutting edge;
said shim comprises a plurality of flat portions, each of at least three of said flat portions configured to contact a corresponding one of at least three of the convex portions of the cutting insert;
said shim comprises a cylindrical through-hole located at the center and a ring-shaped elevated portion around said through-hole; and
said flat portions are disposed on the outside of the elevated portion and are disposed to be higher than the elevated portion.

14. The assembly of claim 13, wherein the flat portions of the shim are formed by grinding.

15. The assembly of claim 13, wherein each of the corner portions of the cutting insert includes a first groove sloping towards a center of the cutting insert and a second groove disposed closer to the center of the cutting insert than said first groove and descending at a steeper rake angle than the first groove.

16. The assembly of claim 13, wherein the cutting insert comprises a through-hole at the center of the cutting insert, the through-hole connecting the top and bottom polygonal surfaces and having a central axis around which the cutting insert has rotational symmetry, and
wherein a diameter of said through-hole decreases from each end of the through-hole towards a center of the through hole, thereby forming a convex portion inside the through-hole.

17. The assembly of claim 16, wherein the assembly of the double-sided indexable cutting insert and the shim further includes an L-shaped lever to secure the cutting insert.

18. The assembly of claim 17, wherein said L-shaped lever is configured to contact the convex portion of the cutting insert's through-hole, thereby applying a clamping force to the cutting insert in lateral and downward directions.

19. The assembly of claim 18, wherein:
the point at which the L-shaped lever contacts the cutting insert measured from the through-hole's bottom is 0.6a to 0.8a, wherein a is defined as the length of the cutting insert's through-hole.

20. The assembly of claim 18, wherein an angle ($\theta$) of the clamping force with respect to the horizontal plane where the L-shaped lever contacts the cutting insert is between 5° and 40°.

* * * * *